United States Patent [19]

Schnebel et al.

[11] Patent Number: 4,835,451

[45] Date of Patent: May 30, 1989

[54] SWITCHING CIRCUIT FOR FIVE-PHASE STEPPING MOTOR AND METHOD OF SWITCHING

[75] Inventors: Gerhard Schnebel, Neuried; Hansjörg Kleis; Ralf Gfrörer, both of Lahr, all of Fed. Rep. of Germany

[73] Assignee: Gerhard Berger GmbH & Co. KG, Lahr, Fed. Rep. of Germany

[21] Appl. No.: 128,395

[22] Filed: Dec. 3, 1987

[30] Foreign Application Priority Data

Dec. 4, 1986 [DE] Fed. Rep. of Germany ....... 3641448

[51] Int. Cl.$^4$ .............................................. H02P 8/00
[52] U.S. Cl. ..................................... 318/696; 318/685
[58] Field of Search ................................ 318/696, 685

[56] References Cited

U.S. PATENT DOCUMENTS 4,663,577  5/1987  Satomi ................................. 318/696

Primary Examiner—William M. Shoop, Jr.
Assistant Examiner—Saul M. Bergmann
Attorney, Agent, or Firm—Peter K. Kontler

[57] ABSTRACT

The invention relates to a switching circuit for a permanently excited five-phase stepping motor with a pentagonal circuit of series-connected stator windings. The junctions between neighboring stator windings are connected by electronic switches to different poles of a voltage source or assume a deactivated or floating position. By means of such switches, one can place adjoining windings in series to achieve a half step operation. In one embodiment, half-step operation is obtained by first supplying four stator windings with current while the fifth winding is shorted and subsequently connecting two windings in series by disconnecting or deactivating the junction between them so that all of the windings are supplied with current. In a further embodiment, at least two junctions are deactivated so that the motor can be operated with double the normal operating voltage.

20 Claims, 4 Drawing Sheets

Fig. 10

| STEP | S1 + | S1 0 | S1 − | S2 + | S2 0 | S2 − | S3 + | S3 0 | S3 − | S4 + | S4 0 | S4 − | S5 + | S5 0 | S5 − |
|---|---|---|---|---|---|---|---|---|---|---|---|---|---|---|---|
| 1  | X |   |   |   | X |   | X |   |   |   | X |   | X |   |   |
| 2  |   | X |   |   | X |   | X |   |   |   | X |   | X |   |   |
| 3  |   |   | X |   | X |   | X |   |   |   | X |   | X |   |   |
| 4  |   |   | X | X |   |   |   | X |   |   | X |   | X |   |   |
| 5  |   |   | X | X |   |   | X |   |   |   | X |   | X |   |   |
| 6  |   |   | X | X |   |   |   | X |   |   | X |   | X |   |   |
| 7  |   |   | X | X |   |   |   |   | X |   | X |   | X |   |   |
| 8  |   |   | X | X |   |   |   |   | X | X |   |   | X |   |   |
| 9  |   |   | X | X |   |   |   |   | X | X |   |   | X |   |   |
| 10 |   |   | X | X |   |   |   |   | X | X |   |   |   | X |   |
| 11 |   |   | X | X |   |   |   |   | X | X |   |   |   |   | X |
| 12 |   | X |   | X |   |   |   |   | X | X |   |   |   |   | X |
| 13 | X |   |   |   | X |   |   |   | X | X |   |   |   |   | X |
| 14 | X |   |   |   |   | X |   |   | X | X |   |   |   |   | X |
| 15 | X |   |   |   |   | X |   |   | X | X |   |   |   |   | X |
| 16 | X |   |   |   |   | X |   | X |   | X |   |   |   |   | X |
| 17 | X |   |   |   |   | X | X |   |   | X |   |   |   |   | X |
| 18 | X |   |   |   |   | X | X |   |   |   | X |   |   |   | X |
| 19 | X |   |   |   |   | X | X |   |   |   |   | X |   |   | X |
| 20 | X |   |   |   |   | X | X |   |   |   |   | X |   | X |   |

Fig. 11

| STEP | S1 + | S1 0 | S1 − | S2 + | S2 0 | S2 − | S3 + | S3 0 | S3 − | S4 + | S4 0 | S4 − | S5 + | S5 0 | S5 − |
|---|---|---|---|---|---|---|---|---|---|---|---|---|---|---|---|
| 1  |   | X |   |   | X |   | X |   |   | X |   |   | X |   |   |
| 2  |   | X |   |   | X |   | X |   |   | X |   |   |   | X |   |
| 3  |   |   | X |   | X |   | X |   |   | X |   |   |   | X |   |
| 4  |   |   | X | X |   |   | X |   |   | X |   |   |   | X |   |
| 5  |   |   | X |   | X |   |   | X |   | X |   |   |   | X |   |
| 6  |   |   | X |   | X |   | X |   |   |   | X |   |   | X |   |
| 7  |   |   | X |   | X |   | X |   |   |   | X |   |   |   | X |
| 8  |   | X |   |   |   | X | X |   |   |   | X |   |   |   | X |
| 9  |   | X |   | X |   |   | X |   |   |   | X |   |   |   | X |
| 10 |   | X |   | X |   |   |   | X |   |   | X |   |   |   | X |
| 11 |   | X |   | X |   |   |   | X |   |   |   | X |   |   | X |
| 12 |   | X |   | X |   |   |   | X |   |   |   | X |   | X |   |
| 13 | X |   |   | X |   |   |   | X |   |   |   | X |   | X |   |
| 14 | X |   |   |   |   | X |   | X |   |   |   | X |   | X |   |
| 15 | X |   |   |   |   | X |   |   | X |   |   | X |   | X |   |
| 16 | X |   |   |   |   | X |   |   | X | X |   |   |   | X |   |
| 17 | X |   |   |   |   | X |   |   | X | X |   |   | X |   |   |
| 18 |   | X |   |   |   | X |   |   | X | X |   |   | X |   |   |
| 19 |   | X |   |   | X |   |   |   | X | X |   |   | X |   |   |
| 20 |   | X |   |   |   | X | X |   |   | X |   |   | X |   |   |

SWITCHING CIRCUIT FOR FIVE-PHASE STEPPING MOTOR AND METHOD OF SWITCHING

The invention relates to a switching circuit for permanent-magnet-energized five-phase stepping motors with stator windings which are connected in series to form a pentagonal circuit, the junctions between individual stator windings being connected to electronic switches for the application of a supply voltage of different polarities.

BACKGROUND OF THE INVENTION

Stepping motors are well known including those which use pentagonal windings, see for example, West German Pat. No. 35 33 295 Al and West German Patent Application publications Nos. 19 07 762; 21 49 473; and 29,46,861.

In stepping motors wherein the stator windings are connected in series to form a pentagonal circuit, it is possible to rely on a control circuit which comprises fewer parts than, for example, a so-called H-bridge circuit. Furthermore, the pentagonal (five-corner) circuit can be connected by way of five connecting conductors so that the outlay for wiring is also reduced; in fact, it is reduced in half in comparison with an H-bridge circuit. However, a drawback of presently-known pentagonal or five-corner switching circuits is that it is not possible to carry out a half-step operation in contrast to the more expensive H-bridge circuit.

SUMMARY OF THE INVENTION

One object of the present invention is to provide a simple switching circuit for a five-phase stepping motor wherein the advantages of the H-bridge circuit are combined with those of the five-corner or pentagonal circuits. It is a particular object of the invention to provide a pentagonal circuit with which half steps for the stepping motor are obtained even though the cost for parts and wiring is greatly reduced in comparison with conventional H-bridge switching circuits.

In accordance with the invention, these objects are accomplished with switches which, in addition to the usual two active switch positions for selective coupling of a junction to different polarities of the supply voltage, have a third switch position. This third switch position corresponds to a deactivation or floating of a junction between neighboring stator windings, which are thereby connected in series.

In this manner, it is possible to connect two or even more windings in series to achieve stator winding circuits that enable half-step operation. Furthermore, it is then possible to employ the same set of stator windings at twice the operating voltage.

The invention also relates to a method of switching a five-phase stepping motor with stator windings which are connected into a pentagonal or five-corner circuit and can selectively receive current by way of electronic switches, each switch being connected to a junction or tap between two neighboring stator windings, the windings being connected to one pole of the supply voltage in the course of a stepping sequence cycle, and four stator windings being supplied with current for a full-step operation.

In order to carry out a half step in accordance with the invention, at least two windings are connected in series by deactivating the junction between them while supplying current to all of the windings.

In one form of stepping motor switching circuit of this invention, the windings are connected to each other in such a way that rotation of the rotor of the motor induces voltages which are theoretically phase shifted by 144° for each pair of neighboring windings. A full step occurs by supplying four windings with current and shorting one winding. A half step is obtained by establishing a configuration in which windings are connected in series while all windings receive current and interleaving this configuration between those needed for a full step. Hence, in order to carry out a continuous half-step operation, current supplying configurations with four current receiving windings and one shorted winding alternate with configurations in which all windings receive current and two of the five windings are connected in series.

It is also possible to resort exclusively to either one of these latter current supply configurations to provide two ways for achieving a continuous full-step operation.

In accordance with a further technique of this present invention, the windings can be connected to each other in such a way that rotation of the rotor induces voltages which are theoretically phase shifted by 72° for two neighboring windings. A full step operation is carried out in such a way that two of the four current receiving windings are connected in series during each step by disengaging or deactivating the junction between such two windings while the fifth winding is short-circuited. Since this involves a series connection of two windings at all times, the motor can be operated at double the normal operating voltage.

In accordance with a further embodiment of the invention, the windings are again connected to each other in such a way that rotation of the rotor induces voltages which cause a theoretical phase shift of 72° between two neighboring windings. Each half-step position, between two full-step positions obtained by using a configuration of four current receiving windings and one short-circuited winding, is achieved by configuring a first group of three windings and a second group of two, series connected windings. This makes it possible to use twice the operating voltage and to carry out half-step operations with a first switching configuration and a full-step operation with another switching configuration.

BRIEF DESCRIPTION OF DRAWINGS

FIG. 10 is a sequence chart showing the positions of switches to achieve a step sequence cycle of 20 half steps;

FIG. 11 is a sequence chart showing different positions of switches to achieve a step sequence cycle of 20 half steps.

DETAILED DESCRIPTION OF DRAWINGS

Figure 2:
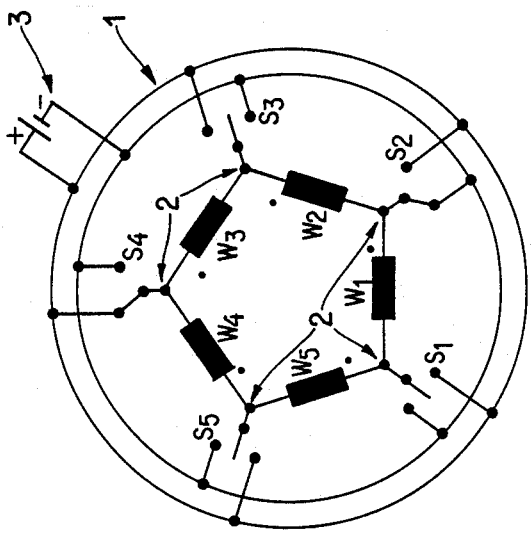
FIG. 2 is a diagram of an arrangement of stator windings wherein the induced voltages in neighboring windings are shifted in phase by 72°.
Figure 1:
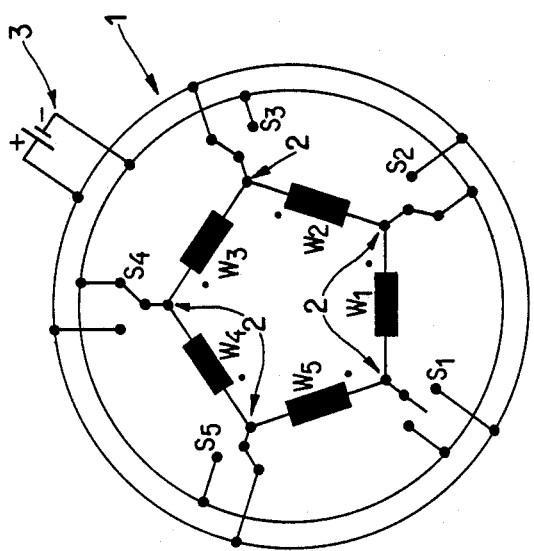
FIG. 1 is a diagram of an arrangement of stator windings wherein the induced voltages in neighboring windings are shifted in phase by 144°.

FIGS. 1 and 2 show pentagonal circuits 1 wherein the stator windings W1 to W5 are connected with switches S1 to S5. For the purpose of clarity, these switches are shown in the form of mechanical switches. However, in actual practice, these are electronic semiconductor switches.

The switches S1 to S5 render it possible to selectively connect the individual junctions 2 between corresponding pairs of windings W1 to W5 with the poles of a source 3 of electrical energy such as a DC battery.

In accordance with one form of the invention, switches S1 to S5, in addition to being able to connect a junction 2 between two active switching positions in which the junction is connected with either the positive or negative pole of the DC energy source, have a neutral or floating switch position. In this neutral position an associated junction 2 is "deactivated" or electrically allowed to float. Consequently, those windings, which are connected by a "deactivated" junction 2, are, in effect, connected in series.

Figure 3:
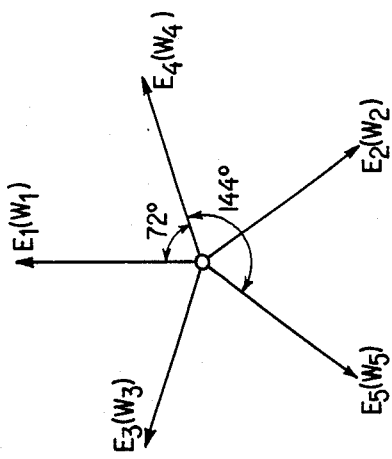
FIG. 3 is a vector diagram of five induced voltages of the windings in a stepping motor of the invention.

FIG. 3 shows five induced voltages E1 to E5 of the windings W1 to W2 in the form of vectors. The time sequence of the voltages is approximately sinusoidal, and such voltages develop during continuous rotation of the rotor. The vectors denote in particular the various phase positions of the voltages relative to each other. FIG. 3 and its vectors further show that in the case of a pentagonal circuit with windings W1 to W5 according to FIG. 1, the induced voltages of neighboring windings are shifted in phase by 144°.

In the pentagonal circuit with the windings W1 to W5 of FIG. 2, the phase shift between the induced voltages in neighboring windings equals 72°.

Figure 4:
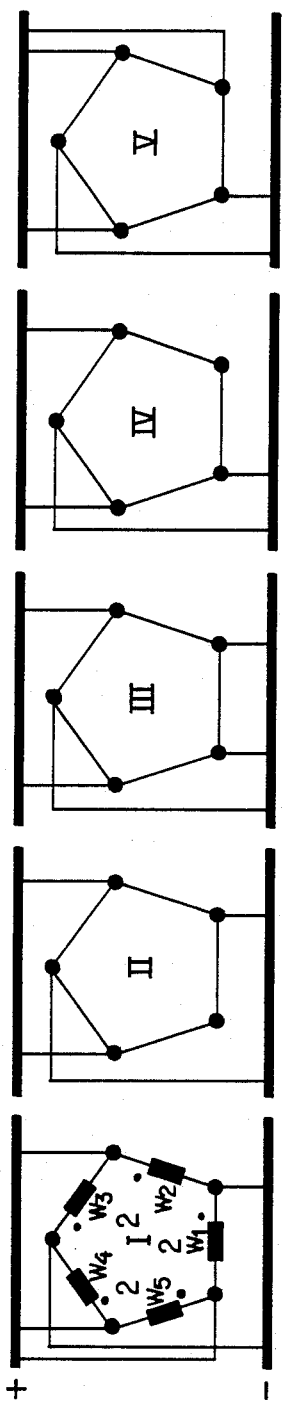
FIG. 4 is a schematic diagram of configurations achieved by circuit switching for a half-step operation.
Figure 5:
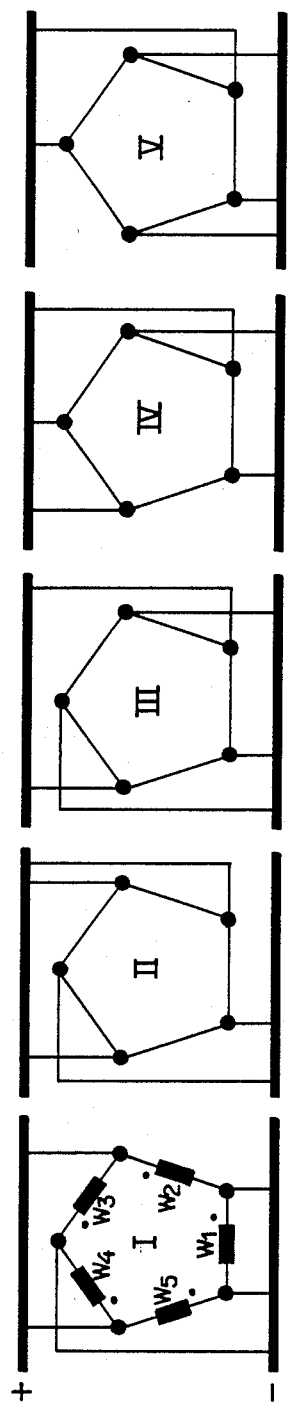
FIG. 5 is a schematic diagram of configurations achieved by circuit switching for a full-step operation.
Figure 6:
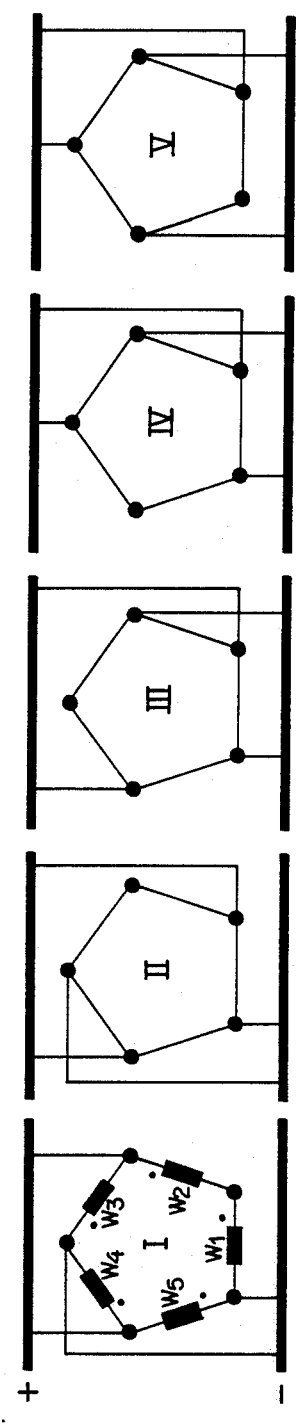
FIG. 6 is a schematic diagram of circuit configurations which differ from those of FIG. 5, but achieve a full-step operation.

FIGS. 4, 5 and 6 show different switching configurations for five stepping sequences I to V. For the sake of simplicity, the connections to the poles of the energy source are shown without the switches, the same as in FIGS. 7, 8 and 9. The arrangement of windings in the pentagonal circuit of FIGS. 4 to 6 corresponds to that of FIG. 1, and the arrangement of windings in the circuit of FIGS. 7 to 9 corresponds to that of FIG. 2.

In order to carry out a full-step operation according to FIG. 1, four windings are connected with the energy source during each step and one of the windings is shorted as can be readily seen by looking at the stepping sequences I to V of FIG. 5. In the stepping position I, for example, both poles of the winding W1 are connected to the negative pole of the energy source and, accordingly, this winding is shorted. On the other hand, the terminals of each of the windings W2 to W5 are connected to different (positive and negative) poles of the energy source. By operating the circuit cyclically, each step brings about a change in the switching configuration, namely the winding W1 is shorted in the step I, the winding W2 is shorted in the step II, the winding W3 is shorted in the step III, and so on; at the same time, the remaining windings (W2 to W5 in the step I, W3-W1 in the step II, etc.) are connected with different poles of the energy source. Thus, the sequence which is shown in FIG. 5 corresponds to the customary full-step operation for a pentagonal circuit.

Since switches S1 to S5 assume neutral "pole-free" positions, it is now possible to carry out half steps between the full-step positions which are shown in FIG. 5. To this end, two windings are connected in series by deactivating the junction between them between two successive full-step configurations so that all of the windings receive current. Such switching configuration can be seen in FIG. 1 as well as in FIGS. 4 and 6. Such configuration exists in FIG. 4 at steps II and IV. In FIG. 6, all of the positions I to V correspond to this switching configuration. FIG. 1 corresponds to the stepping position II in FIG. 4, namely when the junction 2 between the windings W1 and W5 is deactivated while all of the remaining windings W2 to W4 junctions are connected to the energy source by way of the switches S2 to S5.

If according to half-step configurations as in the stepping positions II and IV of FIG. 4 are switched directly one after the other, one carries out full steps from stepping position to stepping position during the further course of operation. This is shown in FIG. 6.

It is thus possible to carry out full steps with assistance from two different switching configurations (FIG. 5 or FIG. 6). Alternatively, it is possible to operate by half steps by alternating the switching configurations according to FIGS. 5 and 6 (this is shown in FIG. 4).

FIG. 10 shows the required switch positions for a stepping sequence cycle of 20 half steps. This chart refers to the pentagonal circuit according to FIG. 1 and, with respect to sequence of steps, corresponds to FIG. 4.

Figure 8:
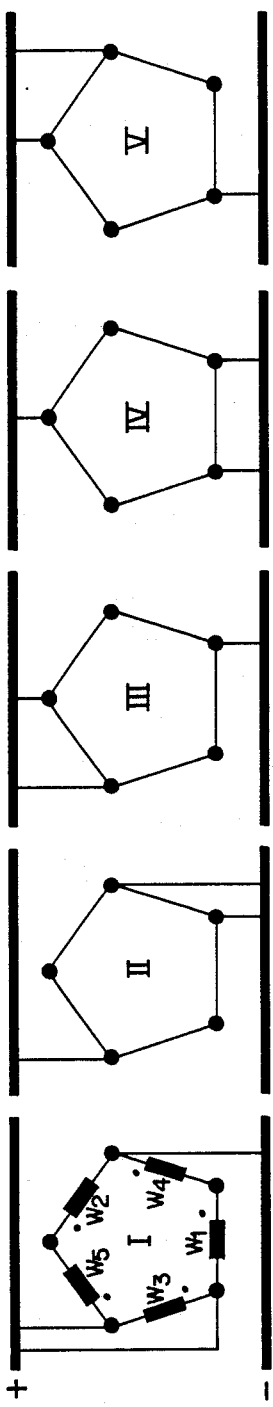

In FIG. 2, the windings W1 to W5 are connected to each other in such a way that, when the rotor turns, there are induced voltages which, theoretically, are phase shifted by 72° for each pair of neighboring windings. This will be understood by referring also to the system of vectors shown in FIG. 3. Since the individual junctions can be "deactivated", this circuit renders it possible to carry out a full step operation with four windings receiving current by connecting two windings in series for each step while the fifth winding is shorted. Thus, two series-connected windings are in all steps connected between the two poles of the energy source. Therefore, it is possible to operate the motor with double the normal operating potential as compared with FIG. 1. FIG. 8 shows, in five stepping positions I to V, the corresponding switching configurations for a full-step operation.

Figure 7:
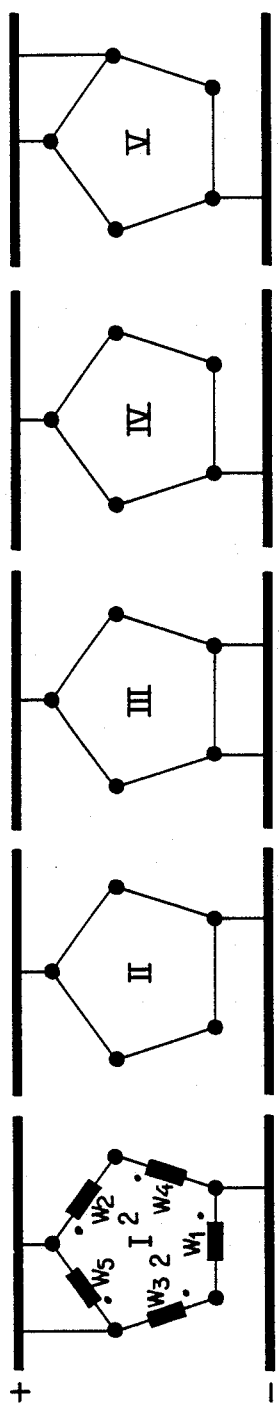
FIGS. 7 through 9 are schematic diagrams showing different circuit configurations corresponding to those of FIGS. 4 through 6 but for double operating voltages, one for a half-step operation and the other for a full-step operation.

It is equally possible to operate the circuit of FIG. 2 with half steps. To this end, one group of three windings and one group of two windings are connected in series across the energy source between each full-step positions. In such case (as shown in FIG. 7), the circuit also is operated with four current-receiving windings and one shorted winding (with two of the four current-receiving windings connected in series). Such a switching configuration is shown in FIG. 2, corresponding to the step position II in FIG. 7.

The step positions I, III and V in FIG. 7 correspond to switch positions of the sequence according to FIG. 8. The stepping positions II and IV in FIG. 7 then constitute switching configuration in each of which a first group of three windings (e.g., W1, W3 and W5) and a second group of two windings (e.g., W2 and W4) are connected in series (see FIG. 2). When the switches assume the just outlined positions, the junction or tap 2 between the windings W1 and W4 as well as between the windings W2 and W5 are respectively connected to the negative and positive poles of the energy source. This type of switching configuration enables half step operation.

FIG. 11 illustrates a chart of switch positions for a stepping sequence cycle of 20 half steps in accordance with the half-step operation of FIG. 7.

Figure 9:
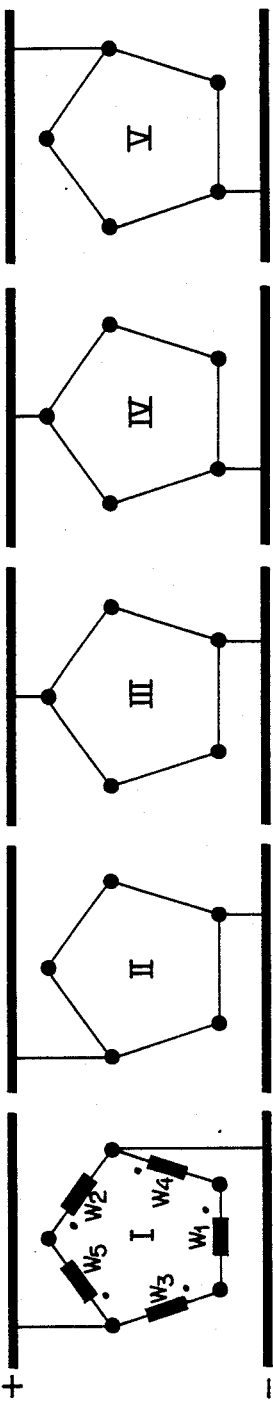

If only the stepping positions I, III, V etc. of FIG. 7 are switched, one converts to a full-step operation according to FIG. 8. However, if only the stepping positions II, IV, etc. of FIG. 7 are selected, one obtains a different full-step operation as shown in FIG. 9.

The improved circuit exhibits the advantage that, once the stator manufacture is completed, the arrangement of windings as shown in FIG. 1 or as shown in FIG. 2 makes it possible to selectively operate the motor with the same efficiency at different voltages. This avoids special adaptations of the stator during its manufacture for operation at different operating voltages. This is currently necessary in accordance with heretofore known proposals especially when the number of windings and/or wire diameters are varied. The invention, therefore, brings about considerable advantages, not only as it simplifies the manufacturing process but also as it reduces the need to maintain different types of stators in inventory. Moreover, the versatility of the stepping motor is greatly enhanced because it is possible to operate the motor with half steps as well as with full steps.

Figure 12:
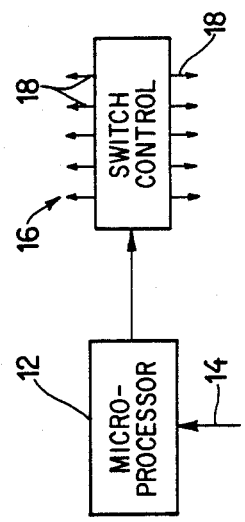
FIG. 12 is a block diagram of an apparatus used to control the switch configurations in accordance with the invention.

FIG. 12 illustrates how a sequence as shown in FIGS. 10 and 11 can be implemented. A microprocessor 12 is shown coupled to a position input 14. The microprocessor delivers signals to an output 16 such as a bus or other network which provides, for example, a control signal on output lines 18. Lines 18 are coupled to appropriate normally open semiconductor switches interposed in pairs between a junction 2 and the DC positive and negative terminals. When no signal occurs on lines 18, the semiconductor switches are open, thus enabling a junction 2 to float if both switches in the pair are open. Other switch arrangements can be implemented to achieve in effect a three-position single pole function at each junction as shown in FIGS. 1 and 2.

Having thus described several embodiments of the invention, its advantages can be appreciated. All features which are recited in the description and in the claims and are shown in the drawing can be used individually or in any desired combination with each other without departing from the spirit of the invention.

What is claimed is:

1. An arrangement for operating a stepping motor, comprising a pentagonal circuit with five coils and five junctions between said coils; a voltage source having a positive terminal and a negative terminal; a switching device between said source and each of said junctions, each of said devices having a first state in which the respective junction is connected to said positive terminal, a second state in which the respective junction is connected to said negative terminal and a third state in which the respective junction is disconnected from both of said terminals; and programmable means for operating said switches, said operating means being programmed to create a configuration in which one of said devices is in said third state and each remaining device is in either said first or second state with said first and second states alternating as considered clockwise or counterclockwise of said circuit.

2. The arrangement of claim 1, wherein said operating means is programmed to cause an advance of one full step by switching said one device and at least one additional device to create another configuration in which said additional device is in said third state and each remaining device is in either said first or second state with said first and second states alternating as considered clockwise or counterclockwise of said circuit.

3. The arrangement of claim 1, wherein said operating means is programmed to cause an advance of one-half step by switching at least said one device to create another configuration in which each of said devices is in either said first or second state with two neighboring devices having the same state and said first and second states otherwise alternating as considered clockwise or counterclockwise of said circuit.

4. The arrangement of claim 1, wherein said motor comprises a stator and said circuit constitutes part of the same, said coils being coupled to one another in such a manner that voltages induced in neighboring coils are theoretically phase shifted by 144° relative to one another.

5. The arrangement of claim 1, wherein said motor is permanent magnet energized.

6. A method of operating a stepping motor having a pentagonal circuit with five coils and five junctions between said coils, comprising the steps of establishing positive and negative polarities for four of said junctions while maintaining the fifth junction essentially neutral, the establishing step being performed in such a manner that the polarities of said four junctions alternate as considered clockwise or counterclockwise of said circuit; and changing the state of at least said fifth junction.

7. The method of claim 6, wherein the changing step causes said motor to advance one full step by creating a configuration in which one of said four junctions is essentially neutral and the remaining junctions have positive and negative polarities which alternate as considered clockwise or counterclockwise of said circuit.

8. The method of claim 6, wherein the changing step causes said motor to advance one-half step by creating a configuration in which each of said junctions has a positive or negative polarity with two neighboring junctions having the same polarity and the polarities of said junctions otherwise alternating as considered clockwise or counterclockwise of said circuit.

9. The method of claim 6, wherein induced voltages are generated in two neighboring coils, said induced voltages being phase shifted by 144° relative to one another.

10. An arrangement for operating a stepping motor, comprising a pentagonal circuit with five coils and five junctions between said coils, each of said coils having a rated voltage; a voltage source having a positive terminal and a negative terminal and arranged to supply an output voltage at least approximately equal to twice said rated voltage; a switching device between said source and each of said junctions, each of said devices having a first state in which the respective junction is connected to said positive terminal, a second state in which the respective junction is connected to said negative terminal and a third state in which the respective junction is disconnected from both of said terminals; and programmable means for operating said devices, said operating means being programmed to create a configuration in which a first device is in said first state, a second device is in said second state and at least two other devices are in said third state with said other devices being separated from one another, as considered clockwise and counterclockwise of said circuit, by said first or second device.

11. The arrangement of claim 10, wherein said operating means is programed to cause an advance of one full step by switching said devices between a preselected configuration in which a first pair of neighboring devices are both in either said first or second state and another configuration in which a second pair of neighboring devices are both in either said first or said second state.

12. The arrangement of claim 10, wherein said operating means is programmed to cause an advance of one full step by switching said devices between a preselected configuration in which a first pair of neighboring devices are both in said third state and another configuration in which a second pair of neighboring devices are both in said third state.

13. The arrangement of claim 10, wherein said operating means is programmed to cause an advance of one-half step by switching said devices between a preselected configuration in which two neighboring devices are both in either said first or second state and another configuration in which two neighboring devices are both in said third state.

14. The arrangement of claim 10, wherein said motor comprises a stator and said circuit constitutes part of the same, said coils being coupled to one another in such a manner that voltages induced in neighboring coils are theoretically phase shifted by 72° relative to one another.

15. The arrangement of claim 10, wherein said motor is permanent magnet energized.

16. A method of operating a stepping motor having a pentagonal circuit with five coils and five junctions between said coils, each of said coils having a rated voltage, and said method comprising the steps of establishing positive and negative polarities for first and second junctions while maintaining two other junctions essentially neutral, the establishing step being performed in such a manner that said other junctions are separated from one another, as considered clockwise and counterclockwise of said circuit, by said first or second junction; changing the state of at least one of said junctions; and generating a supply voltage for said coils at least approximately equal to twice said rated voltage.

17. The method of claim 16, wherein the establishing step creates a preselected configuration in which a first pair of neighboring junctions have the same polarity, the changing step causing said motor to advance one full step by creating a second configuration in which a second pair of neighboring junctions have the same polarity.

18. The method of claim 16, wherein the establishing step creates a preselected configuration in which a first pair of neighboring junctions are essentially neutral, the changing step causing said motor to advance one full step by creating another configuration in which a second pair of neighboring junctions are essentially neutral.

19. The method of claim 16, wherein the establishing and changing steps cause said motor to advance one-half step by creating different configurations including a preselected configuration in which two neighboring junctions have the same polarity and another configuration in which two neighboring junctions are essentially neutral.

20. The method of claim 16, wherein induced voltages are generated in two neighboring coils, said induced voltages being phase shifted by 72° relative to one another.

* * * * *

UNITED STATES PATENT AND TRADEMARK OFFICE
CERTIFICATE OF CORRECTION

PATENT NO. : 4,835,451
DATED : May 30, 1989
INVENTOR(S) : Gerhard SCHNEBEL et al.

It is certified that error appears in the above-identified patent and that said Letters Patent is hereby corrected as shown below:

In the drawing:

FIG. 2, "W2" should read --W4--;
        "W3" should read --W2--;
        "W4" should read --W5--;
        "W5" should read --W3--.

Signed and Sealed this

Twenty-fourth Day of April, 1990

*Attest:*

HARRY F. MANBECK, JR.

*Attesting Officer*      *Commissioner of Patents and Trademarks*